(12) United States Patent
Grundvig et al.

(10) Patent No.: US 8,711,505 B2
(45) Date of Patent: Apr. 29, 2014

(54) STORAGE DEVICE HAVING CLOCK ADJUSTMENT CIRCUITRY WITH FIRMWARE-BASED PREDICTIVE CORRECTION

(75) Inventors: Jeffrey P. Grundvig, Loveland, CO (US); Jason D. Byrne, Lyons, CO (US)

(73) Assignee: LSI Corporation, San Jose, CA (US)

( * ) Notice: Subject to any disclaimer, the term of this patent is extended or adjusted under 35 U.S.C. 154(b) by 149 days.

(21) Appl. No.: 13/306,320

(22) Filed: Nov. 29, 2011

(65) Prior Publication Data

US 2013/0135766 A1 May 30, 2013

(51) Int. Cl.
*G11B 5/09* (2006.01)
(52) U.S. Cl.
USPC .......................................................... 360/51
(58) Field of Classification Search
None
See application file for complete search history.

(56) References Cited

U.S. PATENT DOCUMENTS

| | | | |
|---|---|---|---|
| 7,248,549 B2 | 7/2007 | Rauschmayer | |
| 7,715,143 B2 | 5/2010 | Bliss et al. | |
| 7,872,825 B2 | 1/2011 | Sanghvi | |
| 7,929,237 B2 | 4/2011 | Grundvig et al. | |
| 8,049,982 B1 | 11/2011 | Grundvig et al. | |
| 2005/0128907 A1* | 6/2005 | Katsuki | 369/47.28 |
| 2009/0190283 A1 | 7/2009 | Hammerschmidt et al. | |
| 2011/0085262 A1* | 4/2011 | Grundvig et al. | 360/77.04 |

* cited by examiner

*Primary Examiner* — Regina N Holder
(74) *Attorney, Agent, or Firm* — Ryan, Mason & Lewis, LLP (57) ABSTRACT

A hard disk drive or other disk-based storage device comprises a storage disk, a read/write head configured to read data from and write data to the storage disk, and control circuitry coupled to the read/write head and configured to process data received from and supplied to the read/write head. The control circuitry comprises clock adjustment circuitry configured to generate a control signal for adjusting a parameter of a clock signal based at least in part on timing information obtained by detecting a timing pattern on a surface of the storage disk. The control signal is generated utilizing at least a predictive correction control loop, with the clock adjustment circuitry comprising predictive control firmware that implements at least a portion of the predictive correction control loop.

21 Claims, 5 Drawing Sheets

STORAGE DEVICE HAVING CLOCK ADJUSTMENT CIRCUITRY WITH FIRMWARE-BASED PREDICTIVE CORRECTION

BACKGROUND

Disk-based storage devices such as hard disk drives (HDDs) are used to provide non-volatile data storage in a wide variety of different types of data processing systems. A typical HDD comprises a spindle which holds one or more flat circular storage disks, also referred to as platters. Each storage disk comprises a substrate made from a non-magnetic material, such as aluminum or glass, which is coated with one or more thin layers of magnetic material. In operation, data is read from and written to tracks of the storage disk via a read/write head that is moved precisely across the disk surface by a positioning arm as the disk spins at high speed.

The storage capacity of HDDs continues to increase, and HDDs that can store multiple terabytes (TB) of data are currently available. However, increasing the storage capacity often involves shrinking track dimensions in order to fit more tracks onto each storage disk, such that inter-track interference (ITI) becomes an important performance issue. A number of additional techniques have been developed in an attempt to further increase storage capacity. For example, a technique known as shingled magnetic recording (SMR) attempts to increase storage capacity of an HDD by "shingling" a given track over a previously written adjacent track on a storage disk. In another technique, referred to as bit-patterned media (BPM), high density tracks of magnetic islands are preformed on the surface of the storage disk, and bits of data are written to respective ones of these islands.

A conventional HDD may implement a disk locked clock (DLC) technique to reduce frequency and phase differences between an internal read channel clock and a servo timing pattern on a surface of the storage disk. This allows data sectors to be written with less frequency variation, such that a clock recovery loop in the read channel does not have to handle as much frequency variation when the data sectors are read.

A typical DLC technique may involve, for example, measuring the position and phase of servo wedge address marks (SAMs) that provide the timing pattern on the surface of the storage disk. Additional details regarding measurement of SAMs in an HDD or other disk-based storage device may be found in U.S. Pat. No. 8,049,982, entitled "Methods and Apparatus for Measuring Servo Address Mark Distance in a Read Channel Using Selective Fine Phase Estimate," which is commonly assigned herewith and incorporated by reference herein.

SUMMARY

Illustrative embodiments of the invention provide HDDs or other types of disk-based storage devices that exhibit enhanced operating performance by implementing predictive correction portions of DLC circuitry or other clock adjustment circuitry in firmware and other portions in hardware.

In one embodiment, an HDD or other disk-based storage device comprises a storage disk, a read/write head configured to read data from and write data to the storage disk, and control circuitry coupled to the read/write head and configured to process data received from and supplied to the read/write head. The control circuitry comprises clock adjustment circuitry configured to generate a control signal for adjusting a parameter of a clock signal based at least in part on timing information obtained by detecting a timing pattern on a surface of the storage disk. The control signal is generated utilizing at least a predictive correction control loop, with the clock adjustment circuitry comprising predictive control firmware that implements at least a portion of the predictive correction control loop.

One or more of the embodiments of the invention provide significant improvements in disk-based storage devices. For example, by implementing particular predictive correction portions of the DLC circuitry or other type of clock adjustment circuitry in firmware and other portions in hardware, overall operating performance of the disk-based storage device is improved, and storage density can be increased.

DETAILED DESCRIPTION

Embodiments of the invention will be illustrated herein in conjunction with exemplary disk-based storage devices, control circuitry and associated read channel clock adjustment techniques. It should be understood, however, that these and other embodiments of the invention are more generally applicable to any disk-based storage device in which improved performance in terms of accurate and efficient clock adjustment control is desired. Additional embodiments may be implemented using components other than those specifically shown and described in conjunction with the illustrative embodiments.

Figure 1:
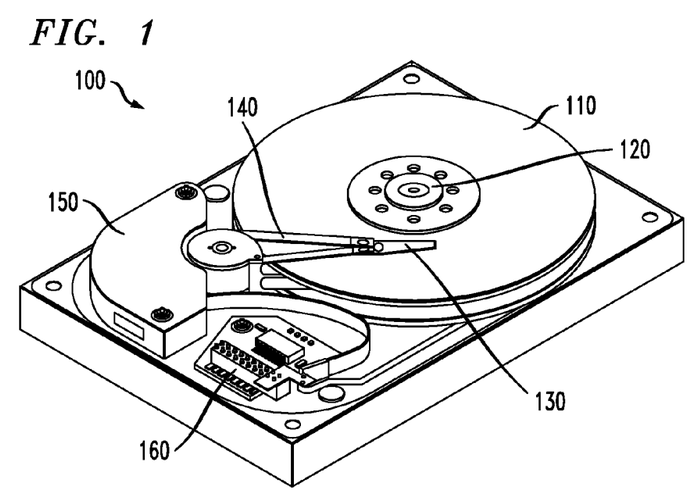
FIG. 1 shows a perspective view of a disk-based storage device in accordance with an illustrative embodiment of the invention.

FIG. 1 shows a disk-based storage device 100 in accordance with an illustrative embodiment of the invention. The storage device 100 in this embodiment more specifically comprises an HDD that includes a storage disk 110. The storage disk 110 has a storage surface coated with one or more magnetic materials capable of storing data in the form of magnetization states. The storage disk 110 is connected to a spindle 120. The spindle 120 is driven by a spindle motor, not explicitly shown in the figure, in order to spin the storage disk 110 at high speed.

Data is read from and written to the storage disk 110 via a read/write head 130 that is mounted on a positioning arm 140. The position of the read/write head over the magnetic surface of the storage disk 110 is controlled by an electromagnetic actuator 150. The electromagnetic actuator 150 and its associated driver circuitry in the present embodiment may be viewed as comprising a portion of what is more generally referred to herein as "control circuitry" of the storage device 100. Such control circuitry in this embodiment is assumed to further include additional electronics components arranged on an opposite side of the assembly and therefore not visible in the perspective view of FIG. 1. The term "control circuitry" as used herein is therefore intended to be broadly construed so as to encompass, by way of example and without limitation, drive electronics, signal processing electronics, and associated processing and memory circuitry, and may further encompass other elements utilized to control positioning of a read/write head relative to a storage surface of a storage disk in a storage device. A connector 160 is used to connect the storage device 100 to a host computer or other related processing device.

It is to be appreciated that, although FIG. 1 shows an embodiment of the invention with only one instance of each of the single storage disk 110, read/write head 130, and positioning arm 140, this is by way of illustrative example only, and alternative embodiments of the invention may comprise multiple instances of one or more of these or other drive components. For example, one such alternative embodiment may comprise multiple storage disks attached to the same spindle so all such disks rotate at the same speed, and multiple read/write heads and associated positioning arms coupled to one or more actuators.

Also, the storage device 100 as illustrated in FIG. 1 may include other elements in addition to or in place of those specifically shown, including one or more elements of a type commonly found in a conventional implementation of such a storage device. These and other conventional elements, being well understood by those skilled in the art, are not described in detail herein. It should also be understood that the particular arrangement of elements shown in FIG. 1 is presented by way of illustrative example only. The disclosed techniques are more generally applicable without limitation to any storage device application in which it is desirable to provide improved clock adjustment capability within the storage device. Those skilled in the art will therefore recognize that a wide variety of other storage device configurations may be used in implementing embodiments of the invention.

Figure 2:
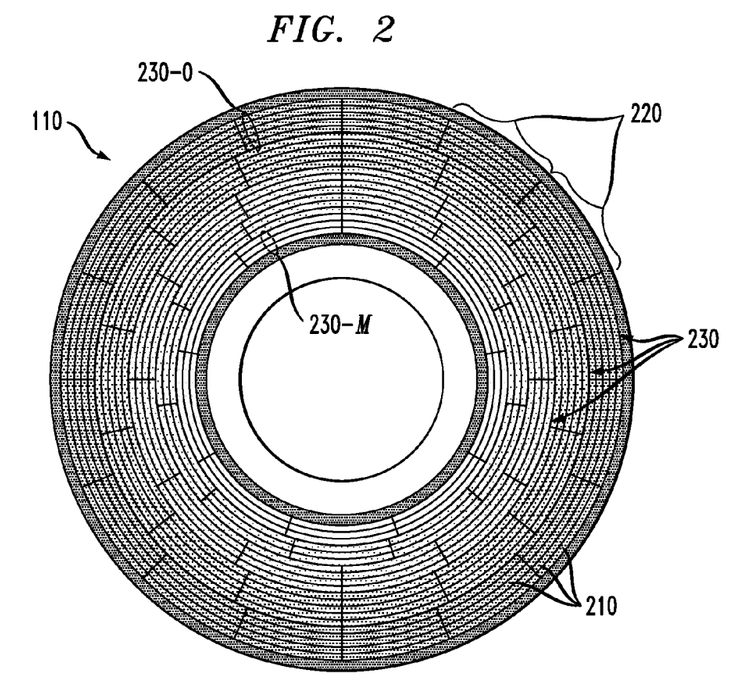
FIG. 2 shows a plan view of a storage disk in the storage device of FIG. 1.

FIG. 2 shows the storage surface of the storage disk 110 in greater detail. As illustrated, the storage surface of storage disk 110 comprises a plurality of concentric tracks 210. Each track is subdivided into a plurality of sectors 220 which are capable of storing a block of data for subsequent retrieval. The tracks located toward the outside edge of the storage disk have a larger circumference when compared to those located toward the center of the storage disk. The tracks are grouped into several annular zones 230, where the tracks within a given one of the zones have the same number of sectors. Those tracks in the outer zones have more sectors than those located in the inner zones. In this example, it is assumed that the storage disk 110 comprises M+1 zones, including an outermost zone 230-0 and an innermost zone 230-M

The outer zones of the storage disk 110 provide a higher data transfer rate than the inner zones. This is in part due to the fact that the storage disk in the present embodiment, once accelerated to rotate at operational speed, spins at a constant angular or radial speed regardless of the positioning of the read/write head, but the tracks of the inner zones have smaller circumference than those of the outer zones. Thus, when the read/write head is positioned over one of the tracks of an outer zone, it covers a greater linear distance along the disk surface for a given 360° turn of the storage disk than when it is positioned over one of the tracks of an inner zone. Such an arrangement is referred to as having constant angular velocity (CAV), since each 360° turn of the storage disk takes the same amount of time, although it should be understood that CAV operation is not a requirement of embodiments of the invention.

Data bit density is generally constant across the entire storage surface of the storage disk 110, which results in higher data transfer rates at the outer zones. Since each outer zone stores more data than the inner zones, the read/write head need not be moved as frequently to read a given amount of data when accessing data in the outer zones. Data can therefore be transferred at a higher rate to or from tracks in the outer zones than to or from tracks in the inner zones.

Accordingly, the outermost annular zone 230-0 of the storage disk has a higher average data transfer rate than the innermost annular zone 230-M of the storage disk. The average data transfer rates may differ between the innermost and outermost annular zones in a given embodiment by more than a factor of two.

As one example embodiment, provided by way of illustration only, the outermost annular zone may have a data transfer rate of approximately 2.3 Gigabits per second (Gb/s), while the innermost annular zone has a data transfer rate of approximately 1.0 Gb/s. In such an implementation, the HDD may more particularly have a total storage capacity of 500 GB and a spindle speed of 7200 RPM, with the data transfer rates ranging, as noted above, from about 2.3 Gb/s for the outermost zone to about 1.0 Gb/s for the innermost zone.

The storage disk 110 is also assumed to include a timing pattern formed on its storage surface. Such a timing pattern may comprise one or more sets of servo wedge address marks (SAMs) formed in particular sectors in a conventional manner. SAMs may be viewed as an example of what are more specifically referred to herein as timing marks. Thus, a "timing pattern" as that term is used herein refers to an arrangement of multiple timing marks.

The particular data transfer rates and other features referred to in the embodiment described above are presented for purposes of illustration only, and should not be construed as limiting in any way. A wide variety of other data transfer rates and storage disk configurations may be used in other embodiments.

An embodiment of the invention will be described below in conjunction with FIGS. 3 to 5, in which the storage device 100 of FIG. 1 is configured to implement a process for read channel clock adjustment utilizing both predictive correction and reactive correction.

Figure 3:
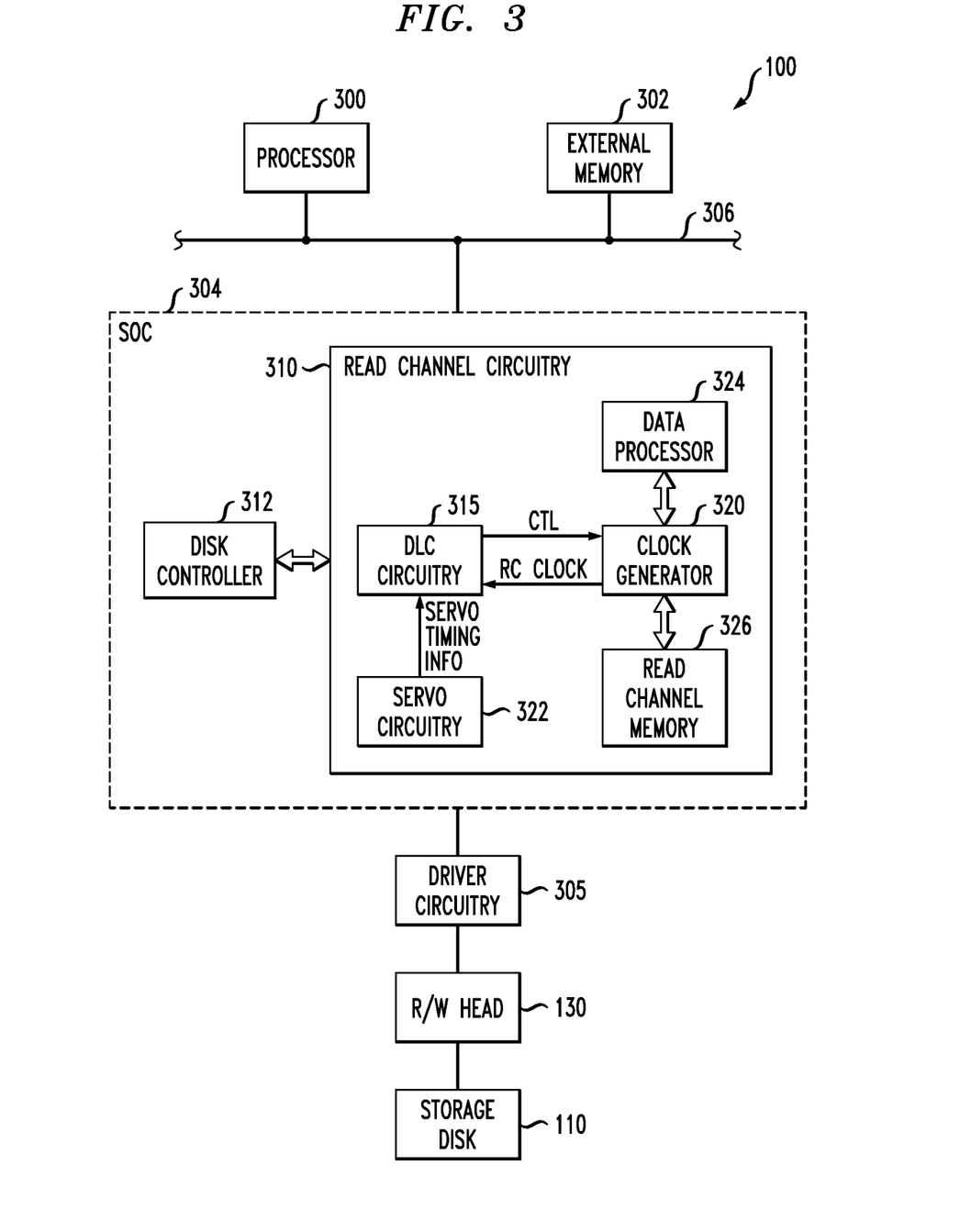
FIG. 3 is a block diagram of a portion of the storage device of FIG. 1 including an exemplary system-on-chip comprising a disk controller and read channel circuitry.

FIG. 3 shows a portion of the storage device 100 of FIG. 1 in greater detail. In this view, the storage device 100 comprises a processor 300, a memory 302 and a system-on-a-chip (SOC) 304, which communicate over a bus 306. The storage device further comprises driver circuitry 305 providing an interface between the SOC 304 and the read/write head 130. The driver circuitry 305 may comprise, for example, a preamplifier and other associated interface circuitry. The memory 302 is an external memory relative to the SOC 304 and other components of the storage device 100, but is nonetheless internal to that storage device. The SOC 304 in the present embodiment includes read channel circuitry 310 and a disk controller 312, and directs the operation of the read/write head 130 in reading data from and writing data to the storage disk 110. The read channel circuitry 310 comprises DLC circuitry 315, a clock generator 320, servo circuitry 322, a data processor 324, and read channel memory 326.

The bus 306 may comprise, for example, one or more interconnect fabrics. Such fabrics may be implemented in the present embodiment as Advanced eXtensible Interface (AXI) fabrics, described in greater detail in, for example, the Advanced Microcontroller Bus Architecture (AMBA) AXI v2.0 Specification, which is incorporated by reference herein. The bus may also be used to support communications between other system components, such as between the SOC 304 and the driver circuitry 305.

The processor 300, memory 302, SOC 304 and driver circuitry 305 may be viewed as collectively comprising one possible example of "control circuitry" as that term is utilized herein. Numerous alternative arrangements of control circuitry may be used in other embodiments, and such arrangements may include only a subset of the components 300, 302, 304 and 305, or portions of one or more of these components. For example, the SOC 304 itself may be viewed as an example of "control circuitry." The control circuitry of the storage device 100 in the embodiment as shown in FIG. 3 is generally configured to process data received from and supplied to the read/write head 130 and to control positioning of the read/write head 130 relative to the storage disk 110.

The DLC circuitry 315 of SOC 304 may be viewed as an example of what is more generally referred to herein as "clock adjustment circuitry." Such clock adjustment circuitry is configured to generate a control signal for adjusting a parameter of a clock signal based at least in part on timing information obtained by detecting a timing pattern on a surface of the storage disk 110. The term "clock adjustment circuitry" as used herein is intended to be broadly construed, and in this embodiment may comprise, in addition to at least a portion of the DLC circuitry 315, at least portions of one or more additional system elements, such as clock generator 320, servo circuitry 322, data processor 324 and read channel memory 326.

As will be described below, the control signal is generated utilizing at least a predictive correction control loop implemented at least in part in predictive control firmware. In the present embodiment, it is assumed that the control signal is generated utilizing the predictive correction control loop in combination with a reactive correction control loop implemented at least in part in reactive control hardware, in what we refer to herein as a mixed-mode DLC circuitry arrangement. We have determined that this implementation of predictive portion of the DLC circuitry 315 in firmware and reactive portions in hardware serves to improve the responsiveness of the clock adjustment process, and thereby enhances overall operating performance of the disk-based storage device 100. More particularly, the performance of the DLC circuitry 315 may be optimized by using this type of mixed-mode firmware and hardware clock control where a predictive portion of the control is provided using firmware and a reactive portion of the control is provided using hardware. Thus, in the present embodiment predictive control that can benefit from the flexibility and complexity of a firmware-based loop is combined with reactive control that can benefit from the minimal latency provided by a hardware circuit to provide an optimal DLC architecture. Optimal DLC architectures of this type can be particularly beneficial in embodiments that implement high-density storage technologies such as shingled magnetic recording (SMR) and bit-patterned media (BPM).

The DLC circuitry 315 as illustrated in FIG. 3 receives servo timing information from the servo circuitry 322, and also receives a read channel clock from the clock generator 320, which may comprise a conventional clock recovery loop. The servo circuitry 322 generates the servo timing information by detecting the timing pattern formed by SAMs on the surface of the storage disk 110. The DLC circuitry 315 includes a phase error detector that compares the read channel clock signal from generator 320 with the servo timing information from servo circuitry 322. By way of example, this comparison may involve determining if the number of clock cycles of a divided-down version of the read channel clock signal that occur within a time period defined by adjacent detected SAMs is above or below an expected number of such clock cycles.

In such an arrangement, the control signal supplied by the DLC circuitry 315 back to the clock generator 320 may vary in a manner that causes the frequency of the clock signal to increase if the number of clock cycles of the divided-down version of the clock signal that occur within the time period defined by adjacent detected SAMs is below the expected number of such clock cycles. Similarly, the control signal supplied by the DLC circuitry 315 back to the clock generator 320 may vary in a manner that causes the frequency of the clock signal to decrease if the number of clock cycles of the divided-down version of the clock signal that occur within the time period defined by adjacent detected SAMs is above the expected number of such clock cycles. The control signal generated by the DLC circuitry 315 is therefore configured to vary responsive to the comparison of the read channel clock and the servo timing information so as to cause the frequency and phase of the read channel clock to be locked to the servo timing information.

The above-described variations in the control signal may be generated, for example, using predictive and reactive control loops, as will be described in greater detail below in conjunction with FIGS. 4 and 5.

It should be noted that certain operations of the SOC 304 in the storage device 100 of FIG. 3 may be directed by processor 300, which executes code stored in external memory 302. For example, the processor 300 may be configured to execute code stored in the memory 302 for performing at least a portion of a clock adjustment process carried out by the SOC 304. Thus, at least a portion of the clock adjustment functionality of the storage device 100 may be implemented at least in part in the form of software code.

The external memory 302 may comprise electronic memory such as random access memory (RAM) or read-only memory (ROM), in any combination. In the present embodiment, it is assumed without limitation that the external memory 302 is implemented at least in part as a double data rate (DDR) synchronous dynamic RAM (SDRAM). The memory 302 is an example of what is more generally referred to herein as a "computer-readable storage medium." Such a medium may also be writable.

Although the SOC 304 in the present embodiment is assumed to be implemented on a single integrated circuit, that integrated circuit may further comprise portions of the processor 300, memory 302, driver circuitry 305 and bus 306. Alternatively, portions of the processor 300, memory 302, driver circuitry 305 and bus 306 may be implemented at least in part in the form of one or more additional integrated circuits, such as otherwise conventional integrated circuits designed for use in an HDD and suitably modified to provide clock adjustment functionality as disclosed herein.

An example of an SOC integrated circuit that may be modified to incorporate an embodiment of the present invention is disclosed in U.S. Pat. No. 7,872,825, entitled "Data Storage Drive with Reduced Power Consumption," which is commonly assigned herewith and incorporated by reference herein.

Other types of integrated circuits that may be used to implement processor, memory or other storage device components of a given embodiment include, for example, a microprocessor, digital signal processor (DSP), application-specific integrated circuit (ASIC), field-programmable gate array (FPGA) or other integrated circuit device.

In an embodiment comprising an integrated circuit implementation, multiple integrated circuit dies may be formed in a repeated pattern on a surface of a wafer. Each such die may include a device as described herein, and may include other structures or circuits. The dies are cut or diced from the wafer, then packaged as integrated circuits. One skilled in the art would know how to dice wafers and package dies to produce packaged integrated circuits. Integrated circuits so manufactured are considered embodiments of the invention.

Although shown as part of the storage device 100 in the present embodiment, one or both of the processor 300 and memory 302 may be implemented at least in part within an associated processing device, such as a host computer or server in which the storage device is installed. Accordingly, elements 300 and 302 in the FIG. 3 embodiment may be viewed as being separate from the storage device 100, or as representing composite elements each including separate processing or memory circuitry components from both the storage device and its associated processing device. As noted above, at least portions of the processor 300 and memory 302 may be viewed as comprising "control circuitry" as that term is broadly defined herein.

Figure 4:
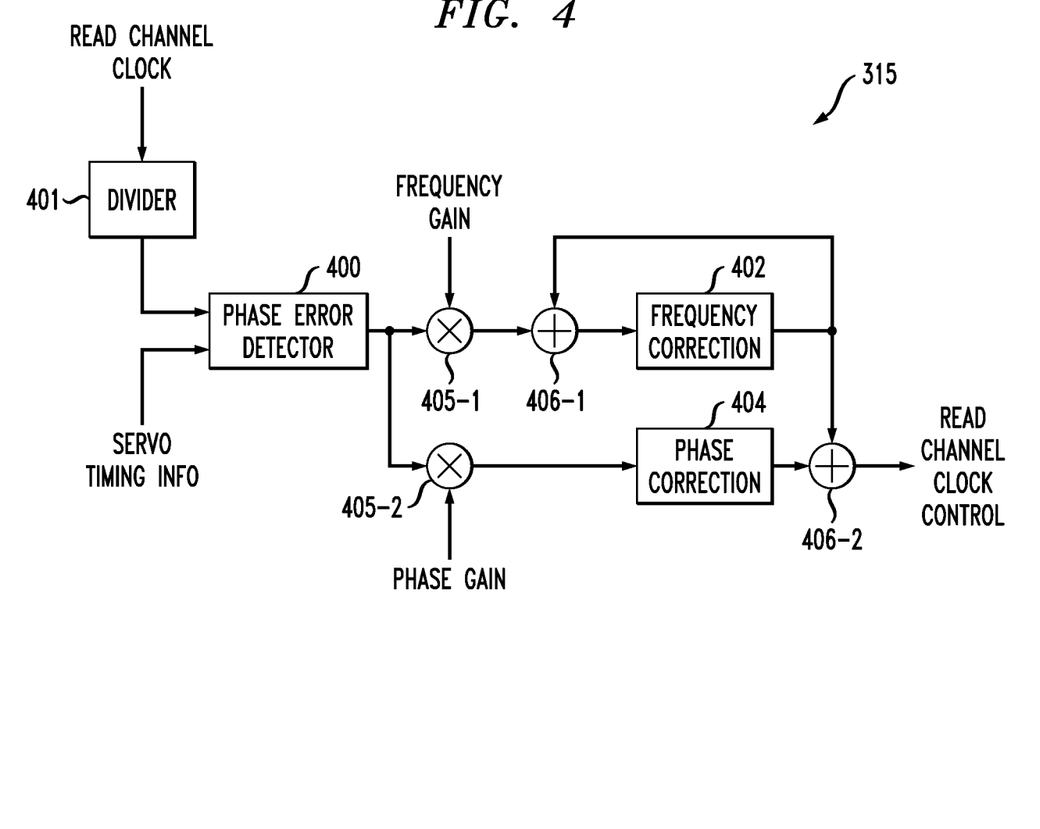
FIG. 4 shows DLC circuitry of the read channel circuitry of FIG. 3 in an illustrative embodiment.

FIG. 4 shows the DLC circuitry 315 in greater detail. A phase error detector 400 has a first input for receiving a divided-down version of the read channel clock from a divider 401 and a second input for receiving servo timing information from the servo circuitry 322. The DLC circuitry further comprises a frequency correction block 402 and a phase correction block 404. The output of the phase error detector 400 is multiplied by a frequency gain value and a phase gain value in multipliers 405-1 and 405-2, respectively.

The output of multiplier 405-1 is applied via a signal combiner 406-1 to an input of the frequency correction block 402. The output of the frequency correction block 402 is applied to an input of a second signal combiner 406-2, and is also fed back to an input of the signal combiner 406-1. The output of multiplier 405-2 is applied to an input of the phase correction block 404. The signal combiner 406-2 combines combine outputs of the frequency correction block 402 and the phase correction block 404 and provides at its output a read channel clock control signal. The read channel clock control signal is supplied back to the clock generator 320 and utilized to control adjustment of the read channel clock in the manner previously described.

Elements of the DLC circuitry 315 as shown in FIG. 4 form portions of a predictive correction control loop and a reactive correction control loop. The predictive correction control loop operates simultaneously with the reactive correction control loop. This embodiment is assumed to implement second order control terms so as to provide phase and frequency correction. Other types of arrangements are possible. For example, a given embodiment may implement a third order control term for correction of delta frequency, which refers to the rate of change of the frequency.

The predictive correction control loop in this embodiment comprises elements 400, 402, 405-1, 406-1 and 406-2, and is configured to provide frequency correction for the read channel clock signal based on the servo timing information. A given iteration of such frequency correction may utilize multiple phase error samples. The predictive correction control loop may also include additional system elements, such as the read channel clock divider 401 as well as portions of the clock generator 320.

The reactive correction control loop in this embodiment comprises elements 400, 404, 405-2, and 406-2, and is configured to provide phase correction for the read channel clock signal relative to the servo timing information. A given iteration of such phase correction may utilize a single phase error sample. The reactive correction control loop may also include additional system elements, such as the read channel clock divider 401 as well as portions of the clock generator 320.

Thus, in this embodiment, the predictive correction control loop controls the frequency adjustment, and is implemented primarily in firmware. It has the flexibility of operating using multiple phase error samples and can therefore implement more complex predictive correction algorithms, such as those which detect and correct for periodic or otherwise repetitive components in the read channel clock frequency behavior of the storage device. Any such variations that can be predicted ahead of time could be handled by the firmware algorithm and corresponding clock correction values queued in advance to be applied at specific known intervals or times.

As a more particular example, a firmware-based predictive correction algorithm could be designed to form predictive correction values using state variable estimators, adaptive filters, oscillation detectors, or combinations of these and other techniques. One typical source of error in a read channel clock of a storage device is a so-called "once around" error component that is linked directly to the speed in revolutions per minute of the spindle motor. A dedicated detector may be implemented as part of the firmware-based algorithm and used to identify characteristics of this once around error component. There could also be other oscillatory error components associated, for example, with mechanical vibrations of the read/write head and positioning arm, and these error components could also be predicted and adapted using the firmware-based algorithm.

The reactive correction control loop controls the phase adjustment, and is implemented primarily in hardware. It has low latency and can react quickly to adjust the read channel clock phase based on a single phase error sample, such as the most recent phase error sample. This allows the reactive correction control loop to correct for any random disturbances or other non-repetitive random errors in the read channel clock phase as quickly as possible. For example, a reactive clock correction value can be computed as quickly as possible after each timing mark is detected and the associated phase error is measured, and can be used to correct for any phase error which cannot be predicted. Use of hardware-based reactive control also allows higher gain values to be used than would otherwise be possible in the reactive correction control loop, resulting in additional performance benefits.

As described above, the mixed-mode DLC circuitry 315 in this embodiment combines firmware-based predictive correction of read channel clock frequency with hardware-based reactive correction of read channel clock phase. This arrangement is illustrated in greater detail in FIG. 5, which shows the DLC circuitry 315 as comprising, in addition to the phase error detector 400 and the divider 401, a predictive correction module 502, a reactive correction module 504, an output queue 510, predictive control firmware 512, and an input queue 514. The output queue 510 has an input coupled to an output of the phase error detector 400 and an output coupled to an input of the predictive control firmware 512. The input queue 514 has an input coupled to an output of the predictive control firmware 512 and an output coupled to an input of the predictive correction module 502.

Figure 5:
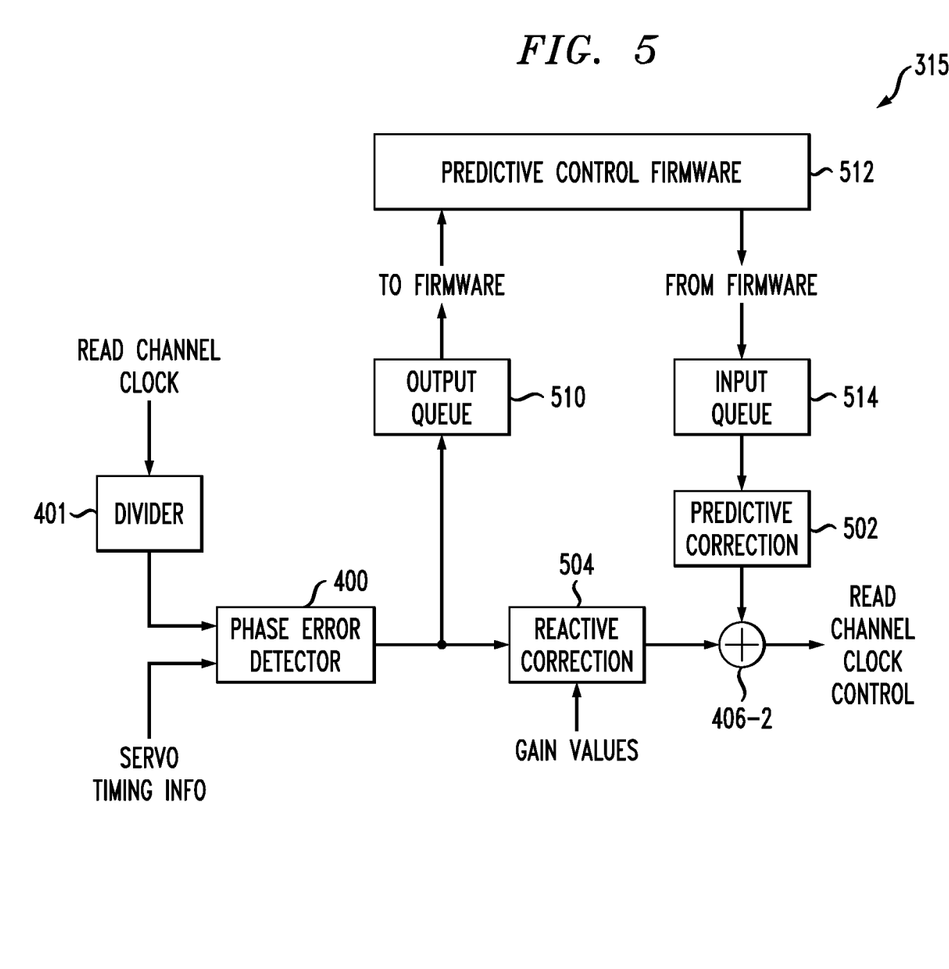
FIG. 5 illustrates one possible manner in which portions of the DLC circuitry of FIG. 4 may be implemented in firmware while other portions are implemented in hardware.

The predictive correction control loop as illustrated in FIG. 5 comprises phase error detector 400, predictive correction module 502, queues 510 and 514, predictive control firmware 512, and signal combiner 406-2, and may include additional system elements, such as divider 401 as well as portions of the clock generator 320. The queues 510 and 514 of the predictive correction control loop are configured to permit the firmware 512 to operate on multiple phase error samples from the phase detector 400. More particularly, the queue 510 buffers multiple phase error samples from the phase error detector 400, and the queue 514 buffers multiple clock correction values generated by the predictive control firmware. Thus, this control loop utilizes not just a single servo error term but potentially adapts to an error history which could include even non-linear repetitive error profiles.

The reactive correction control loop as illustrated in FIG. 5 comprises phase error detector 400, reactive correction module 504, and signal combiner 406-2, and may include additional system elements, such as divider 401 as well as portions of the clock generator 320.

Although in the present embodiment the outputs of the predictive and reactive correction modules are summed together in signal combiner 406-2 in generating the read channel clock control signal, other embodiments may decouple these two correction loops and apply their associated correction values separately and possibly at different times.

It is assumed for purposes of the FIG. 5 embodiment that the predictive correction module 502 is implemented outside of the predictive control firmware 512. This module may be used, for example, to apply a particular clock correction value determined by a predictive algorithm running in the firmware 512. However, the reactive correction module 504 is assumed to be implemented within the reactive control hardware. In other embodiments, the predictive correction module 502 may be implemented at least in part within the predictive control firmware 512.

The predictive correction control loop implemented using the predictive control firmware 512 may provide, for example, a timing mark by timing mark adaption. In this manner any hard timing errors such as a shift in the timing marks being used to drive the predictive correction control loop could be learned using known adaption techniques. Similarly, any mechanical oscillations which might introduce periodic components in the predictive correction control loop could also be learned using known adaption techniques.

As indicated above, the output queue 510 and the input queue 514 are used in the present embodiment to buffer phase error samples and firmware-generated clock correction values, respectively. By way of example, the depth of the queues 510 and 514 may be set depending upon the number of phase error samples that are generated by phase error detector 400 between iterations of an interrupt service routine run by the firmware 512.

It is to be appreciated that the particular circuitry arrangements shown in FIGS. 3, 4 and 5 are presented by way of example only, and other embodiments of the invention may utilize other types and arrangements of elements for implementing clock adjustment functionality as disclosed herein.

As mentioned previously, the storage device configuration can be varied in other embodiments of the invention. For example, the storage device may comprise a hybrid HDD which includes a flash memory in addition to one or more storage disks.

It is also to be appreciated that the particular storage disk configuration and recording mechanism can be varied in other embodiments of the invention. For example, as noted above, recording techniques such as SMR and BPM can be used in one or more embodiments of the invention.

Figure 6:
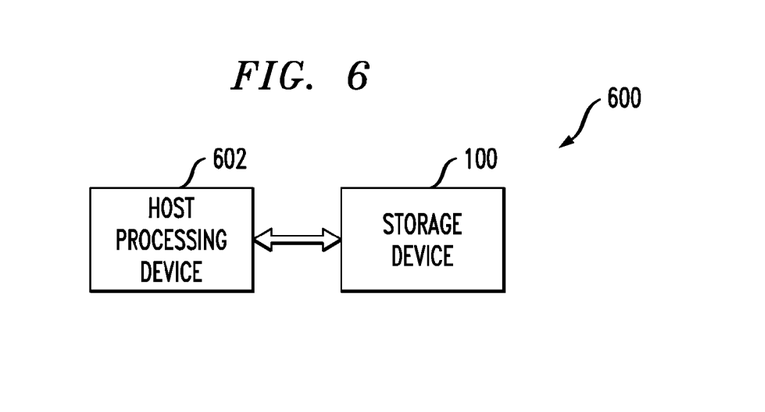
FIG. 6 illustrates interconnection of the storage device of FIG. 1 with a host processing device in a data processing system.

FIG. 6 illustrates a processing system 600 comprising the disk-based storage device 100 coupled to a host processing device 602, which may be a computer, server, communication device, etc. Although shown as a separate element in this figure, the storage device 100 may be incorporated into the host processing device. Instructions such as read commands and write commands directed to the storage device 100 may originate from the processing device 602, which may comprise processor and memory elements similar to those previously described in conjunction with FIG. 3.

Figure 7:
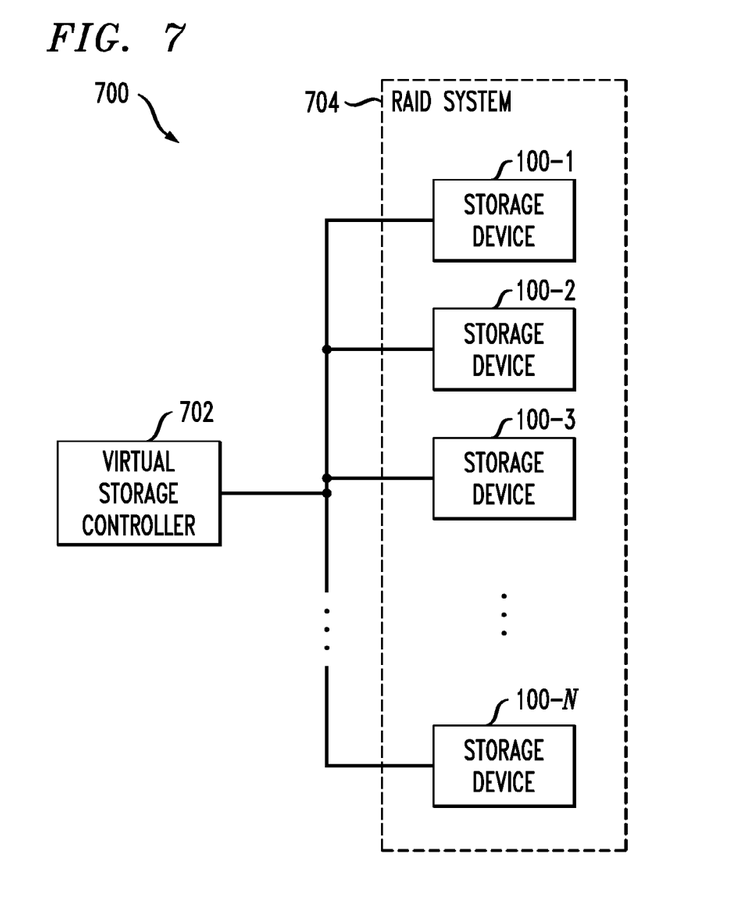
FIG. 7 shows a virtual storage system incorporating a plurality of disk-based storage devices of the type shown in FIG. 1.

Multiple disk-based storage devices 100 may be incorporated into a virtual storage system 700 as illustrated in FIG. 7. The virtual storage system 700, also referred to as a storage virtualization system, illustratively comprises a virtual storage controller 702 coupled to a RAID system 704, where RAID denotes Redundant Array of Independent Disks. The RAID system more specifically comprises N distinct storage devices denoted 100-1, 100-2, . . . 100-N, one or more of which are assumed to be configured to include read channel memory access control functionality as disclosed herein. These and other virtual storage systems comprising HDDs or other disk-based storage devices of the type disclosed herein are considered embodiments of the invention. The host processing device 602 in FIG. 6 may also be an element of a virtual storage system, and may incorporate the virtual storage controller 702.

Again, it should be emphasized that the above-described embodiments of the invention are intended to be illustrative only. For example, other embodiments can use different types and arrangements of storage disks, read/write heads, control circuitry and other storage device elements for implementing the described functionality. Also, the particular manner in which a given firmware-based predictive correction control loop is implemented in clock adjustment circuitry of a storage device may be varied in other embodiments. These and numerous other alternative embodiments within the scope of the following claims will be apparent to those skilled in the art.

What is claimed is:

1. An apparatus comprising:
    at least one integrated circuit comprising control circuitry adapted for coupling to a read/write head configured to read data from and write data to a storage disk, the control circuitry being configured to process data received from and supplied to the read/write head;
    the control circuitry comprising:
    clock adjustment circuitry configured to generate a control signal for adjusting a parameter of a clock signal based at least in part on timing information obtained by detecting a timing pattern on a surface of the storage disk;
    wherein the control signal is generated utilizing a predictive correction control loop in combination with a reactive correction control loop, the clock adjustment circuitry comprising predictive control firmware that implements at least a portion of the predictive correction control loop and reactive control hardware that implements at least a portion of the reactive correction control loop.

2. The apparatus of claim 1 wherein the clock adjustment circuitry comprises a signal combiner configured to combine outputs of the predictive correction control loop and the reactive correction control loop in generating the control signal.

3. The apparatus of claim 1 wherein the predictive correction control loop is configured to provide frequency correction for the clock signal based on the timing information with a given iteration of such frequency correction being based on a plurality of phase error samples.

4. The apparatus of claim 1 wherein the reactive correction control loop is configured to provide phase correction for the clock signal relative to the timing information with a given iteration of such phase correction being based on a single phase error sample.

5. The apparatus of claim 1 wherein the clock signal comprises a read channel clock signal and the timing information comprises servo timing information generated by detecting the timing pattern on the surface of the storage disk, said timing pattern comprising a plurality of servo marks formed on that surface.

6. The apparatus of claim 5 wherein the control circuitry further comprises:
a disk controller; and
read channel circuitry comprising a read channel memory;
wherein the clock adjustment circuitry is implemented at least in part within the read channel circuitry and is operative to lock the read channel clock signal to the timing information.

7. The apparatus of claim 6 wherein said at least one integrated circuit comprises a system-on-chip integrated circuit that implements both the disk controller and the read channel circuitry.

8. The apparatus of claim 1 wherein the clock adjustment circuitry further comprises a phase error detector configured to implement a comparison based on the clock signal and the timing information.

9. The apparatus of claim 8 wherein the phase error detector determines if a number of clock cycles of a divided-down version of the clock signal that occur within a time period defined by adjacent detected portions of the timing pattern is above or below an expected number of such clock cycles, the clock adjustment circuitry being configured:
to increase a frequency of the clock signal if the number of clock cycles of the divided-down version of the clock signal that occur within the time period defined by adjacent detected portions of the timing pattern is below the expected number of such clock cycles; and
to decrease a frequency of the clock signal if the number of clock cycles of the divided-down version of the clock signal that occur within the time period defined by adjacent detected portions of the timing pattern is above the expected number of such clock cycles.

10. The apparatus of claim 1 wherein the clock adjustment circuitry further comprises a predictive correction module that is implemented outside of the predictive control firmware.

11. The apparatus of claim 10 wherein the predictive correction control loop further comprises:
a first queue having an input coupled to an output of the phase error detector and an output coupled to an input of the predictive control firmware; and
a second queue having an input coupled to an output of the predictive control firmware and an output coupled to an input of the predictive correction module.

12. The apparatus of claim 1 wherein the disk locked clock circuitry comprises a reactive correction module that is implemented within the reactive control hardware.

13. The apparatus of claim 1 further comprising a processor and a memory coupled to the processor, the processor being configured to execute software code stored in the memory, wherein said software code when executed causes the clock adjustment circuitry to generate the control signal.

14. A storage device comprising the apparatus of claim 1.

15. A virtual storage system comprising the storage device of claim 14.

16. The apparatus of claim 1 wherein outputs of the predictive correction control loop and the reactive correction control loop are combined in generating the control signal.

17. A method comprising the steps of:
obtaining a clock signal in a storage device comprising at least one storage disk;
obtaining timing information by detecting a timing pattern on a surface of the storage disk; and
generating a control signal for adjusting a parameter of the clock signal based at least in part on the timing information;
wherein the control signal is generated utilizing a predictive correction control loop that is implemented at least in part using predictive control firmware, in combination with a reactive correction control loop that is implemented at least in part using reactive control hardware.

18. A non-transitory computer-readable storage medium having embodied therein executable code for performing the steps of the method of claim 17.

19. A processing system comprising:
a processing device; and
a storage device coupled to the processing device and comprising at least one storage disk;
wherein the storage device further comprises:
a read/write head configured to read data from and write data to the storage disk; and
control circuitry coupled to the read/write head and configured to process data received from and supplied to the read/write head;
the control circuitry comprising:
clock adjustment circuitry configured to generate a control signal for adjusting a parameter of a clock signal based at least in part on timing information obtained by detecting a timing pattern on a surface of the storage disk;
wherein the control signal is generated utilizing a predictive correction control loop in combination with a reactive correction control loop, the clock adjustment circuitry comprising predictive control firmware that implements at least a portion of the predictive correction control loop and reactive control hardware that implements at least a portion of the reactive correction control loop.

20. An apparatus comprising:
at least one integrated circuit comprising control circuitry adapted for coupling to a read/write head configured to read data from and write data to a storage disk, the control circuitry being configured to process data received from and supplied to the read/write head;
the control circuitry comprising:
clock adjustment circuitry configured to generate a control signal for adjusting a parameter of a clock signal based at least in part on timing information obtained by detecting a timing pattern on a surface of the storage disk;
wherein the control signal is generated utilizing at least a predictive correction control loop, the clock adjustment circuitry comprising predictive control firmware that implements at least a portion of the predictive correction control loop, wherein the clock adjustment circuitry further comprises a predictive correction module that is implemented outside of the predictive control firmware.

21. An apparatus comprising:
at least one integrated circuit comprising control circuitry adapted for coupling to a read/write head configured to read data from and write data to a storage disk, the control circuitry being configured to process data received from and supplied to the read/write head;
the control circuitry comprising:
clock adjustment circuitry configured to generate a control signal for adjusting a parameter of a clock signal based at least in part on timing information obtained by detecting a timing pattern on a surface of the storage disk;
wherein the control signal is generated utilizing at least a predictive correction control loop, the clock adjustment circuitry comprising predictive control firmware that implements at least a portion of the predictive correction control loop; and wherein the apparatus further comprises a processor and a memory coupled to the processor, the processor being configured to execute software code stored in the memory, wherein said software code when executed causes the clock adjustment circuitry to generate the control signal.

* * * * *